United States Patent [19]

Scaramucci

[11] 4,206,903
[45] Jun. 10, 1980

[54] BUTTERFLY VALVE WITH CAM ACTUABLE SEAT

[76] Inventor: Domer Scaramucci, 3245 S. Hattie, Oklahoma City, Okla. 73129

[21] Appl. No.: 932,810

[22] Filed: Aug. 11, 1978

[51] Int. Cl.² ............................................. F16K 1/226
[52] U.S. Cl. .................................. 251/174; 251/306; 251/315; 137/614.11
[58] Field of Search ............... 251/163, 174, 306, 315; 137/614.11

[56] References Cited

U.S. PATENT DOCUMENTS

| | | | |
|---|---|---|---|
| 3,245,653 | 4/1966 | Lavigueur | 251/163 |
| 3,593,960 | 7/1971 | Scaramucci | 251/306 |
| 3,746,302 | 7/1973 | Larsen | 251/163 |
| 3,776,505 | 12/1973 | Nakanishi | 251/163 |
| 3,794,291 | 2/1974 | Suyama | 251/174 |
| 3,815,869 | 6/1974 | Smith | 251/306 |
| 3,934,606 | 1/1976 | Matthews | 251/163 |
| 4,108,199 | 8/1978 | Bonafous | 251/306 |
| 4,125,128 | 11/1978 | Elward et al. | 251/315 |

Primary Examiner—William R. Cline
Assistant Examiner—H. Jay Spiegel
Attorney, Agent, or Firm—Jerry J. Dunlap; Charles A. Codding; Bill D. McCarthy

[57] ABSTRACT

A cam actuable valve wherein annular seats and a valve closure member are axially insertable into a flow passage bore of a valve body. The valve closure member is supported within the flow passage bore by cylindrical trunnions which are partially inserted into the flow passage bore from the exterior of the valve via laterally extending trunnion bores which intersect the flow passage bore and the exterior of the valve body. Cams are formed on the trunnions by forming recesses along chords of the trunnions, the recesses receiving portions of the annular seats when the valve is closed to permit the seats to engage the valve closure member.

11 Claims, 6 Drawing Figures

BUTTERFLY VALVE WITH CAM ACTUABLE SEAT

BACKGROUND OF THE INVENTION

1. Field of the Invention

This invention relates generally to valves and, more particularly but not by way of limitation, to valves having axially insertable seats and valve closure members.

2. Brief Description of the Prior Art

It is known that sealing surfaces and O-rings disposed on seats and valve closure members of valves are subject to excessive wear when the valve closure member is rotated while engaging the seat. To prevent such wear, various camming mechanisms have been devised for displacing the seat from the valve closure member during the initial rotation of the valve closure member. Examples of such mechanisms are disclosed in U.S. Pat. No. 3,776,505, issued Dec. 4, 1973, to Nakanishi, and in U.S. Pat. No. 3,245,653, issued Apr. 12, 1966, to Laviguer. A problem which has existed with the provision of such cam mechanisms is that such provision can result in an added complexity of the valve and in the assembly thereof.

SUMMARY OF THE INVENTION

According to the present invention, a valve is provided with cam actuation of an annular seat while, at the same time, being provided with a simple construction permitting ease of assembly of the valve. For this purpose, circular trunnions which support the valve closure member in a valve body are provided with recesses in portions thereof disposed within a flow passage bore of the valve body and disposed adjacent to the periphery of such flow passage bore. Portions of an annular seat, disposed in the flow passage bore for engaging the valve closure member, enter the recesses in the trunnions when the valve is closed such that the annular seat is permitted to engage the valve closure member when the valve is closed. When the valve is opened, the trunnions engage the annular seat and displace the annular seat away from the valve closure member to prevent excessive wear of sealing surfaces formed on the seat and the valve closure member.

The formation of cams by forming recesses in the trunnions permits the trunnions to be inserted into the flow passage bore via trunnion bores formed between the exterior of the valve and the flow passage bore. Such insertion of the trunnions facilitates ease of assembly of the valve. In particular, the seat and valve closure member can be axially inserted into the flow passage from one end of the valve body and the trunnions can thereafter be inserted through the trunnion bores and connected to the valve closure member.

An object of the present invention is to provide a valve which combines simplicity of construction with cam actuation of a seat thereof.

Another object of the invention is to provide a cam actuable valve which is easily assembled.

Yet a further object of the invention is to reduce wear of sealing surfaces and seal rings disposed on seats and valve closure members of valves wherein the seat and the valve closure member thereof are axially insertable.

Other objects and advantages of the invention will be evident from the following detailed description when read in conjunction with the accompanying drawings which illustrate various embodiments of the invention.

BRIEF DESCRIPTION OF THE DRAWINGS

FIG. 6 is a cross-section taken substantially along line 6—6 of FIG. 5.

Figure 1:
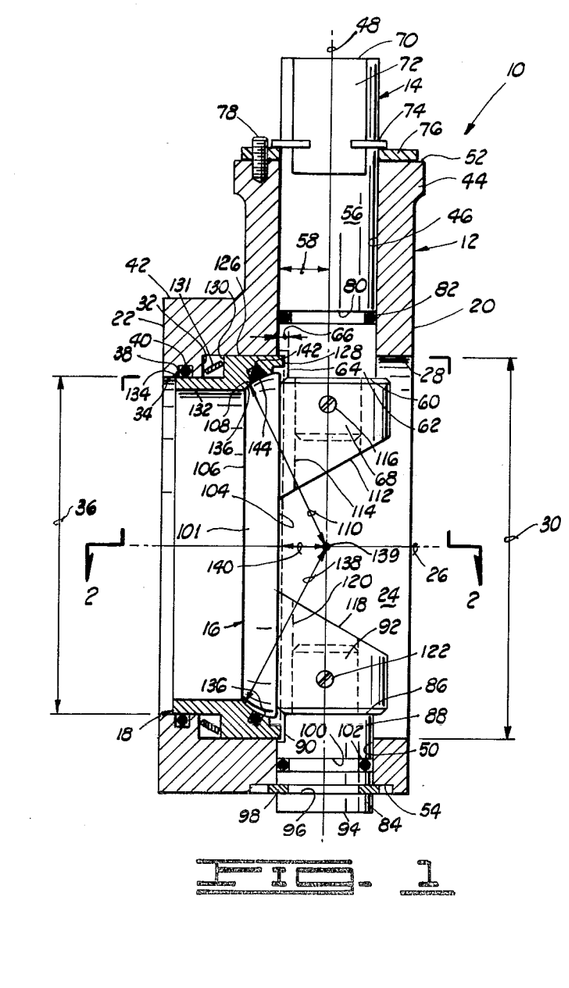
FIG. 1 is a side elevational view in partial cross-section of a valve constructed in accordance with the present invention. This view shows the valve closure member positioned to close the flow passage bore to fluid flow.
Figure 2:
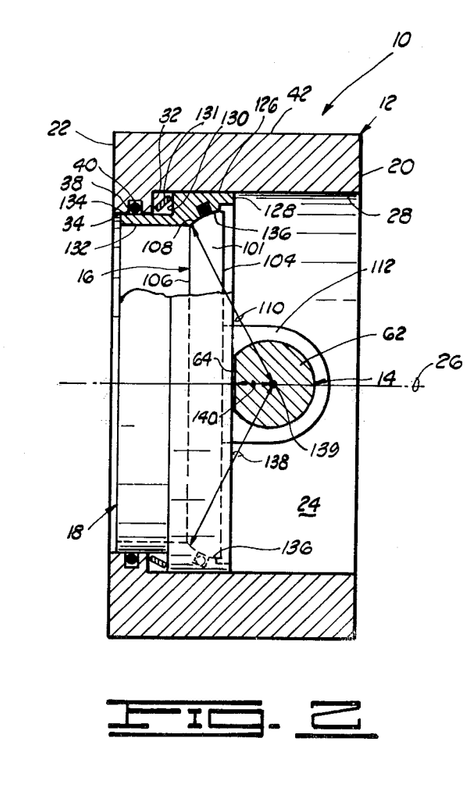
FIG. 2 is a cross-section taken substantially along line 2—2 of FIG. 1.
Figure 3:
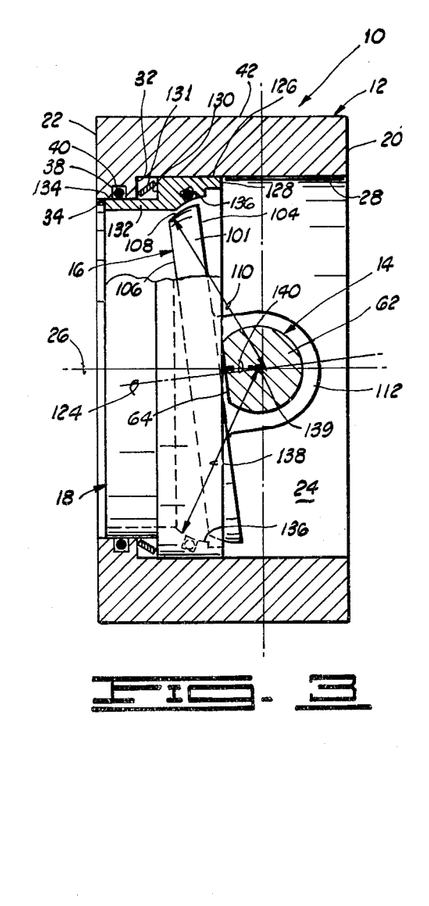
FIG. 3 is a cross-section similar to FIG. 2 but illustrating a position for the valve closure member in which the valve closure member is positioned to partially open the flow passage bore to fluid flow.

BRIEF DESCRIPTION OF FIGS. 1, 2, AND 3

Referring now to FIGS. 1, 2 and 3, shown therein and designated by the general reference numeral 10 is one embodiment of a valve constructed in accordance with the present invention. In general, the valve 10 comprises a valve body 12, a valve stem assembly 14, a valve closure member 16 and an annular seat 18.

The valve body 12 has a first end 20 and a second end 22 generally parallel to the first end 20. A circular flow passage bore 24 is formed through the valve body about a flow axis 26 and the flow passage bore 24 intersects the first end 20 and the second end 22 of the valve body 12 and extends therebetween. Suitable couplings (not shown), communicating with the flow passage bore 24, can be attached to the first end 20 and the second end 22 of the valve body 12 for mounting the valve 10 within a pipeline or the like.

A first portion 28 of the flow passage bore 24, adjacent the first end 20 of the valve body 12, is formed on a first bore diameter 30 and the first portion 28 of the bore 24 terminates at an annular flow passage bore shoulder 32 within the valve body 12. A second portion 34 of the flow passage bore 24 extends between the shoulder 32 and the second end 22 of the valve body 12. The second portion 34 of the flow passage 24 is formed with a second bore diameter 36 which is smaller than the first bore diameter 30. A groove 38 is formed circumferentially about the flow passage bore 24 in the second portion 34 thereof and an annular sealing ring 40, such as an O-ring, is disposed within the groove 38 for a purpose which will be described below.

The valve body 12 has a generally cylindrical outer periphery 42 extending between the ends 20, 22 and formed generally concentrically with the flow passage bore 24. A projection 44 is formed on the valve body 12 adjacent the first end 20 thereof and the projection 44 extends generally radially outwardly from the periphery 42 of the valve body 12. A first trunnion bore 46 is formed through the projection 44 about a stem axis 48 which intersects the flow axis 26 at a right angle, and the first trunnion bore 46 intersects a medial portion of the first portion 28 of the flow passage bore 24. A face 52 is formed substantially perpendicularly to the stem axis 48 on the distal end of the projection 44 and the first trunnion bore 46 intersects the face 52 such that the first trunnion bore 46 extends from the exterior of the valve body 12 to the flow passage bore 24.

A second trunnion bore 50 is formed coaxially to the first trunnion bore 46 through portions of the valve body 12 disposed diametrically oppositely to the projection 44 with respect to the flow axis 26. A flat 54 is formed substantially perpendicularly to the stem axis 48 in portions of the periphery 42 of the valve body 12 adjacent the second trunnion bore 50 and the second trunnion bore 50 intersects the flat 54. Thus the second trunnion bore 50 extends from the exterior of the valve body 12 to the flow passage bore 24. The trunnion bores 46, 50 are each formed with a preselected valve stem bore radius 58 and the trunnion bores 46, 50 coact to form a valve stem bore which intersects the flow passage bore 24 and extends laterally thereto through the valve body 12.

The valve stem assembly 14 comprises a circular first trunnion 56 having a radius substantially equal to the preselected valve stem bore radius 58 such that the first trunnion 56 can be inserted into the valve body 12 from the exterior thereof. The first trunnion 56 is mounted within the first trunnion bore 46 such that the first trunnion bore 46 supports the first trunnion 56 for rotation about the stem axis 48.

The first trunnion 56 extends through the first trunnion bore 46 and terminates within the flow passage bore 24 in a first end 60 such that a portion 62 of the first trunnion 56 is disposed within the flow passsge bore 24 and forms a cam for the annular seat 18 as will be described more fully below. A recess 64 is formed in one side of the portion 62 of the first trunnion 56 and the recess 64 has a preselected recess depth 66. In particular, as shown in FIGS. 2 and 3, the recess 64 is formed along a chord of the first trunnion 56 such that the recess depth 66 of the recess 64 is the sagitta of the chord along which the recess 64 is formed. A circular stud 68 is formed on the first end 60 of the first trunnion 56 coaxially with the first trunnion 56 about the stem axis 48. The purpose of the stud 68 will be discussed below.

The first trunnion 56 terminates exteriorly of the valve body 12 in a second end 70. A pair of flats is formed on opposing sides of the first trunnion 56 and the flats extend along a portion of the first trunnion 56 adjacent the second end 70 thereof. (Only one flat, designated 72 in FIG. 1, is shown.) The flats permit the first trunnion 56 to be rotated in the first trunnion bore 46 via a wrench or the like. A groove (not shown) is formed circumferentially about the first trunnion 56 exteriorly of the first trunnion bore 46 and a spring clip 74 is disposed within groove (not shown). The spring clip 74 engages a retaining ring 76 mounted via a suitable fastener 78 on the face 52 formed on the projection 44 to axially position the first trunnion 56 within the first trunnion bore 46. A circumferential groove 80 is formed in a medial portion of the first trunnion 56 about the stem axis 48 within the first trunnion bore 46 and an annular sealing ring 82, such as an O-ring, is disposed within the groove 80 to prevent leakage of fluid passing through the valve 10 around the first trunnion 56.

The valve stem assembly 14 further comprises a circular second trunnion 84 mounted in the second trunnion bore 50. The radius of the second trunnion 84 is substantially equal to the preselected valve stem bore radius 58 such that the second trunnion 84 can be inserted into the valve body 12 from the exterior thereof. The second trunnion 84 is mounted within the second trunnion bore 50 such that the second trunnion bore 50 supports the second trunnion 84 for rotation about the stem axis 48.

The second trunnion 84 extends through the second trunnion bore 50 and terminates at a first end 86 within the flow axis bore 24 such that a portion 88 of the second trunnion 84 is disposed within the flow passage bore 24. As in the case of the first trunnion 56, the portion 88 of the second trunnion 84 provides a cam for the annular seat 18. A recess 90 is formed in one side of the portion 88 along a chord of the portion 88 such that the sagitta of the chord along which the recess 90 is formed defines a depth for the recess 90. As in the case of the first trunnion 56, the depth of the recess 90 is substantially equal to the preselected recess depth 66. As will be discussed more fully below, the recess 90 is aligned about the stem axis 48 with the recess 64 formed in the first trunnion 56. A circular stud 92 is mounted on the first end 86 of the second trunnion 84 and extends therefrom into the flow passage bore 24 coaxially with the second trunnion 84 for a purpose to be described below.

The second trunnion 84 terminates in a second end 94 exteriorly of the valve body 12 and a groove 96 is formed circumferentially about the second trunnion 84 near the second end 54 thereof. A spring clip 98 is disposed within the groove 96 and the spring clip 98 engages the flat 54 formed in the periphery 42 of the valve body 12 to axially position the second trunnion 84 within the second trunnion bore 50. A groove 100 is formed circumferentially about the second trunnion 84 within the second trunnion bore 50 and an annular sealing ring 102, such as an O-ring, is disposed within the groove 100 to prevent leakage of the valve 10 around the trunnion 84.

The valve closure member 16 comprises a circular disc 101 formed about a disc axis 124 shown in FIG. 3. The disc 101 has a first face 104 and a second face 106, substantially parallel to the first face 104, and the valve closure member 16 further comprises a first trunnion mount 112 and a second trunnion mount 118 mounted on the first face 104. The trunnion mounts 112, 118 are positioned substantially in diametric opposition with respect to the disc axis 124 on the first face 104.

A first trunnion mount bore 114, sized to mate with the stud 68 formed on the first end 60 of the first trunnion 56, is formed through the first trunnion mount 112. In the assembled valve 10, the stud 68 is disposed within the first trunnion mount bore 114 and is secured therein via a suitable fastener 116 such as a set screw or the like.

A second trunnion mount bore 120, coaxial with the first trunnion mount bore 114 and sized to mate with the stud 92 formed on the first end 86 of the second trunnion 84, is formed through the second trunnion mount 118. In the assembled valve 10, the stud 92 is disposed within the second trunnion mount bore 120 and secured therein via a suitable fastener 122 such as a set screw or the like.

The recesses 64 and 90, formed in the first trunnion 56 and the second trunnion 84 respectively, are aligned when the valve 10 is assembled by positioning the trunnions 56 and 84 such that the recesses 64 and 90 are adjacent the disc 101 and substantially parallel to the faces 104, 106 thereof. Following such alignment, the fasteners 116, 112 are tightened to connect the valve closure member 16 to the valve stem assembly 14. Subsequently, the valve closure member 16 is rotatable with the valve stem assembly 14.

The trunnion mount bores 114, 120 are formed, with respect to the disc 101, about an axis which intersects the disc axis 124 so that the stem axis 48 intersects the disc axis 124 in the assembled valve 10 via the connection of the trunnions 56, 84 to the valve closure member 16. The valve closure member 16 is positioned on the studs 68 and 92 of the first and second trunnions, 56 and 84 respectively, such that the intersection of the disc axis 124 with the stem axis 48 coincides with the intersection of the flow axis 26 with the stem axis 48.

A sealing surface 108 is formed on the valve closure member 16 between the first and second faces, 104 and 106, thereof, the sealing surface 108 extending about the periphery of the disc 101. The sealing surface 108 is shaped to conform to a portion of a spherical surface having a preselected sealing surface radius and the sealing surface 108 is centered on the intersection of the common axis of the trunnion mount bores 114, 120 with the disc axis 124 so that, in the assembled valve 10, the sealing surface 108 is centered on the intersection of the flow axis 26 with the stem axis 48. Accordingly, the sealing surface radius has been indicated in the drawings as a radius, designated 110, for the sealing surface 108 and the radius 110 has been drawn from the intersection of the stem axis 48 with the flow axis 26.

The annular seat 18 is disposed within the first portion 28 of the flow passage bore 24 between the valve stem assembly 14 and the annular flow passage bore shoulder 32. The annular seat 18 is generally ring-shaped and has an outer diameter substantially equal to the first bore diameter 30 such that the outer periphery 126 of the annular seat 18 slidingly engages the first portion 28 of the flow passage bore 24. Accordingly, in the assembled valve 10, the flow axis 26 of the flow passage 24 forms an axis of cylindrical symmetry for the annular seat 18.

The annular seat 18 has a first end 128, positioned adjacent the valve stem assembly 14 in the assembled valve 10, and a second end 130, positioned near the flow passage bore shoulder 32 in the assembled valve 10. A belleville spring 131, disposed between the flow passage bore shoulder 32 and the second end 130 of the annular seat 18 urges the annular seat 18 toward the first end 20 of the valve body 12. That is, the belleville spring 131 urges the annular seat 18 toward the valve stem assembly 14 and the valve closure member 16.

The first end 128 of the annular seat 18 is planar in shape and is formed substantially perpendicularly to the periphery 126 such that, in the assembled valve 10, the first end 128 of the annular seat 18 forms an annular, planar stem engagement face extending about the flow passage bore 24 and substantially perpendicularly to the flow axis 26.

An annular projection 132 is formed on the second end 130 of the annular seat 18 and the annular projection 132 extends therefrom toward the second end 22 of the valve body 12. The outer periphery 134 of the annular projection 132 is formed on a diameter substantially equal to the second bore diameter 36 and the periphery 134 slidingly engages the second portion 34 of the flow passage bore 24 in the assembled valve 10. The length of the annular projection 132 is selected such that the annular projection overlays the groove 38 to permit the annular sealing ring 40 to provide a seal for the flow passage bore 24 about the annular seat 18.

A sealing surface 136 is formed on the inner periphery of the annular seat 18 near the first end 128 thereof and the sealing surface 136 is shaped to conform to the surface of a sphere having a radius 138 equal to the preselected sealing surface radius. The center of the sealing surface 136 is disposed on the axis of cylindrical symmetry for the annular seat 18 so that, in the assembled valve 10, the center of the sealing surface 136 is disposed on the flow axis 26. The center of the sealing surface 136 is displaced outwardly from the first end 128 of the annular seat 18 so that, in the assembled valve 10, the center of the sealing surface 136 is located at a point, indicated by a small circle on the flow axis 26 and designated 139 in the drawings, which is displaced from the first end 128 of the annular ring 18 toward the stem axis 48. (As will be clear to those skilled in the art, the center of the sealing surface 136 will coincide with the center of the sealing surface 108 of the valve closure member 16 when the sealing surfaces 108 and 136 mate. That is, the center of the sealing surface 136 will coincide with the intersection of the flow axis 26 with the stem axis 48. Such coincidence has been illustrated in FIGS. 1 and 2.) In particular, the sealing surface 136 is formed such that the center thereof is displaced from the first end 128 of the annular seat 18 by a preselected distance 140 which is less than the stem bore radius 58 but greater than the difference between the stem bore radius 58 and the recess depth 66 of the recesses 64 and 90 formed in the trunnions 56 and 84.

In one preferred embodiment of the valve 10, the valve closure member 16 and the annular seat 18 are formed of a relatively hard material, such as steel, and a groove 142 is formed circumferentially about the sealing surface 136 of the annular seat 18. An annular sealing ring 144, such as an O-ring, constructed of a relatively soft material, is disposed in the groove 142 to provide a seal between the sealing surface 136 of the annular seat 18 and the sealing surface 108 of the valve closure member 16 shown in FIGS. 1 and 2.

The construction of the valve 10 as has been described above facilitates the assembly of the valve 10 as will now be described. Initially, the valve body 12, the annular seat 18 and the trunnions 56 and 84 are provided with minor fittings prior to assembly of such components into the valve 10. In particular, the annular sealing ring 40 is placed within the groove 38 formed in the second portion 34 of the flow passage bore 24 and the retaining ring 76 is attached to the projection 44 of the valve body 12 via the fastener 78. Annular sealing rings 82 and 102 and spring clips 74 and 98 are disposed in the grooves of the first and second trunnion, 56 and 84 respectively, provided therefor. The annular sealing ring 144 is placed in the groove 142 formed in the sealing surface 136 of the annular seat 18.

The valve 10 is then assembled as follows: the belleville spring 131 is placed over the annular projection 132 on the second end of the annular seat 18 and the belleville spring 131 is placed in engagement with the second end 130 of the annular seat 18; the annular seat 18 and belleville spring 131 are inserted into the flow passage bore 24 via the first end 20 of the valve body 12 and positioned such that the belleville spring 131 engages the flow passage bore shoulder 32; the valve closure member 16 is inserted into the flow passage bore 24 through the first end 20 and positioned such that the sealing surface 108 thereof engages the sealing surface 136 of the annular seat 18; the trunnions 56 and 84 are inserted through the trunnion bores 46 and 50 respectively and positioned such that the studs 68 and 92 extend into the bores 114 and 120 of the trunnion mounts 112 and 118 respectively; and the fasteners 116 and 122 are tightened to form the valve 10 into an assembled whole.

OPERATION OF FIGS. 1, 2 and 3

The operation of the valve 10 is particularly shown in FIGS. 2 and 3. When the valve 10 is placed in a closure position wherein the valve 10 is closed to fluid flow, such position being shown in FIGS. 1 and 2, the sealing surface 108 of the valve closure member 16 is disposed concentrically with the flow passage bore 24 and is displaced from the stem axis 48 toward end 22 of the valve 10. That is, the sealing surface 108 is aligned with respect to the annular seat 18 for mating engagement between the sealing surface 108 of the valve closure member 16 and the sealing surface 136 of the annular seat 18. Moreover, the recesses 64 and 90 formed in the first trunnion 56 and the second trunnion 84 respectively are faced toward the stem engagement face formed on the first end 128 of the annular seat 18.

The belleville spring 131 urges the annular seat 18 toward the trunnions 56 and 84 and toward the valve closure member 16 so that the position of the annular seat 18 is determined either by engagement of the sealing surface 136 thereof with the sealing surface 108 of the valve closure member 16 or by engagement of the stem engagement face on the first end 128 of the annular seat 18 with the trunnions 56 and 84. The selection of the distance 140 separating the center of curvature 139 of the sealing surface 136 of the annular seat 18 from the first end 128 thereof to be greater than the difference between the stem bore radius 58 and the recess depth 66 causes the annular seat 18 to engage the valve closure member 16 rather than the trunnions 56 and 84. In particular, when the center of curvature 139 of the sealing surface 136 is coincident with the intersection of the flow axis 24 with the stem axis 48, permitting engagement of the sealing surface 136 with the sealing surface 108, the first end 128 of the annular seat is displaced a distance 140 from the stem axis 48 while portions of the trunnions 56 and 84 defining the recesses 64 and 90 are displaced from the stem axis 48 the lesser distance equal to the difference between the valve stem bore radius 58 and the recess depth 66. Accordingly, the engagement between sealing surfaces 108 and 136 will permit entry of portions of the annular seat 18 adjacent the first end 128 thereof into the recesses 64 and 90 to a depth which is insufficient to permit engagement between the annular seat 18 and the trunnions 56 and 84. In such position, the annular seat 18 and the valve closure member 16 coact to block the flow passage bore 24 as has been shown in FIG. 2.

The valve 10 is opened by turning the valve stem assembly 14 and the valve closure member 16 about the stem axis 48. As illustrated in FIG. 3, a rotation of the valve stem assembly 14 results in the engagement of the stem engagement face formed on the first end 128 of the annular seat 18 with the portions 62 and 88 of the trunnions 56 and 84 in which the recesses 64 and 90 are formed. Since the distance 140 is less than the valve stem bore radius 58; that is, less than the radii of the portions 62 and 88, engagement between the stem engagement face of the annular seat 18 and portions 62 and 88 of the trunnions 56 and 84 respectively displaces the annular seat 18 toward the second end 22 of the valve 10. That is, as has been shown in FIG. 3, the center of curvature 139 of the sealing surface 136 of the annular seat 18 is displaced away from the intersection of the flow axis 26 with the stem axis 48. Accordingly, the portions 62 and 88 form cams for disengaging the sealing surface 136 of the annular seat 18 from the sealing surface 108 of the valve closure member 16 during the initial portion of the opening of the valve 10. Thereafter, the valve stem assembly 14 and the valve closure member 16 can be turned through a large angle permitting substantial flow of fluid through the valve 10 while the sealing surfaces 108 and 136 are disengaged.

Figure 4:
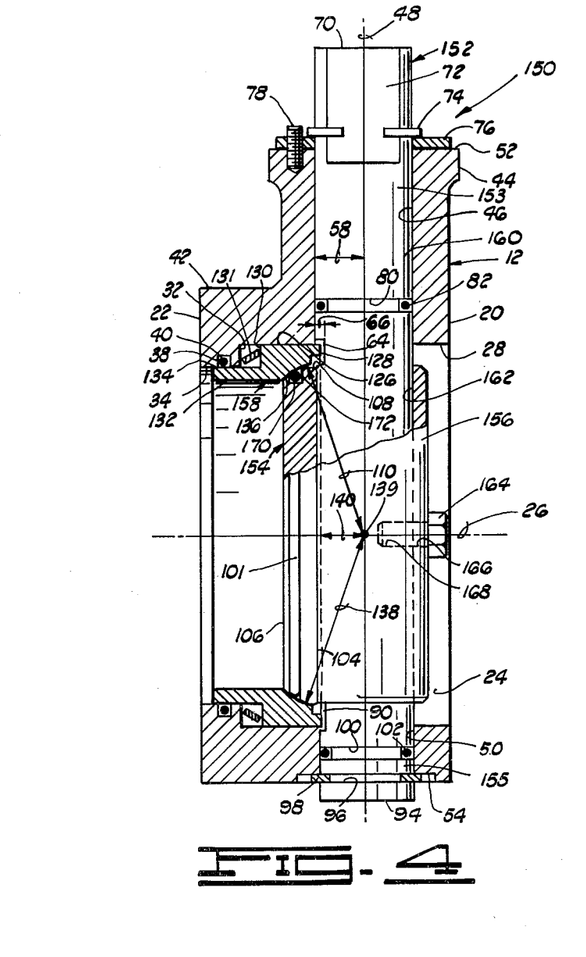
FIG. 4 is a side elevational view in partial cross-section and cutaway detail of a second embodiment of a valve constructed in accordance with the present invention.

DESCRIPTION OF FIG. 4

FIG. 4 illustrates a second embodiment of a valve, designated by the numeral 150, constructed in accordance with the present invention. In particular, the trunnions of the valve stem assembly of the valve 150 are formed unitarily. That is, the trunnions are portions of a shaft and the valve closure member is modified accordingly to permit mounting thereof on a shaft. The valve 150 also illustrates a second manner of mounting an annular sealing ring for providing a seal between the sealing surfaces formed on the annular seat and on the valve closure member.

In the valve 150, the valve stem assembly, designated 152 in FIG. 4, comprises a valve stem shaft 160 which is supported for rotation about the stem axis 48 by the trunnion bores 46 and 50 and the shaft 160 extends across the flow passage bore 24. A first portion 153 of the shaft 160, disposed generally between the end 70 of the shaft 160 (the end 70 of the shaft 160 corresponds to the end 70 of the first trunnion 56 and, accordingly, has been similarly designated) and the flow axis 26, forms the first trunnion for the valve 150 and a second portion 155, comprising the remainder of the shaft 160 forms the second trunnion for the valve 150. The trunnions 153 and 155 are provided with grooves 80 and 100 for annular sealing rings 82 and 102 in the same manner that the trunnions 56 and 84 are provided with such grooves and the trunnions 153 and 155 are similarly provided with grooves, such as the groove 96, for springs clips 74 and 98.

In the valve 150, the valve closure member, designated 154 in FIG. 4, is modified for mounting thereof on a shaft; that is, the shaft 160, rather than on studs, such as the studs 68 and 92 formed on the ends of separate trunnions. In particular, in the valve 150, the trunnion mounts 112 and 118 of the valve closure member 16 are replaced with a shaft mount 156 mounted on the first face 104 of the disc 101 of the valve closure member 154. The shaft mount 156 has a shaft mounting bore 162 formed on a radius substantially equal to the valve stem bore radius 58 so that the shaft 160 can be inserted through the bore 162 when the valve 150 is assembled. The shaft 160 is secured within the bore 162 via a fastener 164 which passes through an aperture 166 formed in the shaft mount 156 and engages a threaded bore 168 formed in the shaft 160.

The above construction of the valve stem assembly 152 and the valve closure member 154 and the mode of mounting the valve closure member 154 on the valve stem assembly 152 simplifies the alignment of the recesses 64 and 90 and the sealing surface 108 of the valve closure member 154 when the valve 150 is assembled. In particular, the recesses 64 and 90 are aligned with each other when the shaft 160 is constructed and the positioning of the threaded bore 168 in the shaft 160 and the aperture 166 in the shaft mount 156 positions the sealing surface 108 with respect to the recesses 64 and 90.

As has been noted above, the valve 150 is also constructed to provide a second manner of providing a seal between the sealing surface 108 of the valve closure member 154 and the sealing surface 136 of the annular seat, the annular seat of the valve 150 being designated by the numeral 158 in FIG. 4. In particular, a circumferential groove 170 is formed in the sealing surface 108 of the valve closure member 154 and an annular sealing ring 172, such as an O-ring, is disposed therein to provide a seal between the periphery 108 and the sealing surface 136 of the annular seat 158. In accordance with disposing an annular sealing ring in the periphery 108 of the valve closure member 154, no circumferential groove, such as the groove 142 of the annular seat 18, is formed in the annular seat 158 and no annular sealing ring such as the annular sealing ring 144 mounted in the sealing surface 136 of the annular seat 18, is mounted in the sealing surface 136 of the annular seat 158.

The valve 150 is assembled in a manner similar to the manner of assembling the valve 10. Specifically, the annular sealing rings 40, 82, 102 and 172 are first positioned in the grooves provided therefor in the valve body 12, the shaft 160 and the valve closure member 154 respectively and the retaining ring 76 is mounted on the valve body 12. The belleville spring 131 is positioned on the annular projection 132 of the annular seat 158 and the annular seat 158 and valve closure member 154 are sequentially inserted into the flow passage bore 24 from the first end 20 thereof. The shaft 160 is then inserted through the trunnion bores 46 and 50 and through the bore 162 in the trunnion mount 154 and the fastener 164 is screwed into the bore 168 in the shaft 160 to fix the valve closure member 154 on the shaft 160. Assembly is completed by inserting the spring clip 98 in the groove 96 in the second trunnion portion of the shaft 160. The operation of the valve 150 is the same as the operation of the valve 10.

Figure 5:
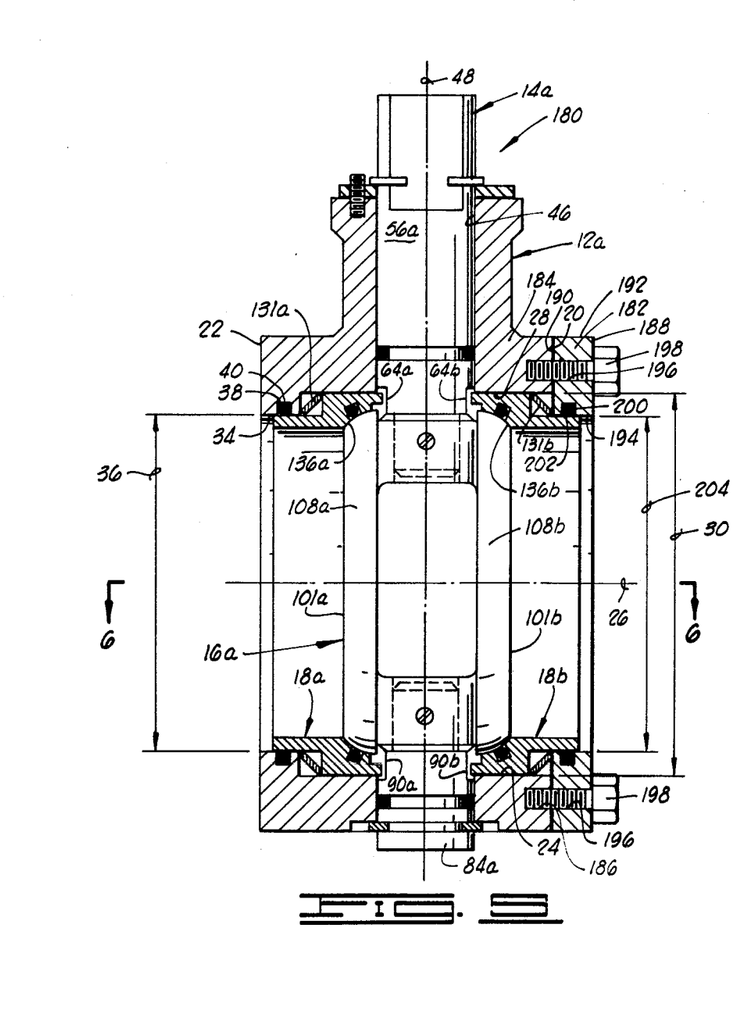
FIG. 5 is a side elevational view in partial cross-section of a third embodiment of a valve constructed in accordance with the present invention.
Figure 8:
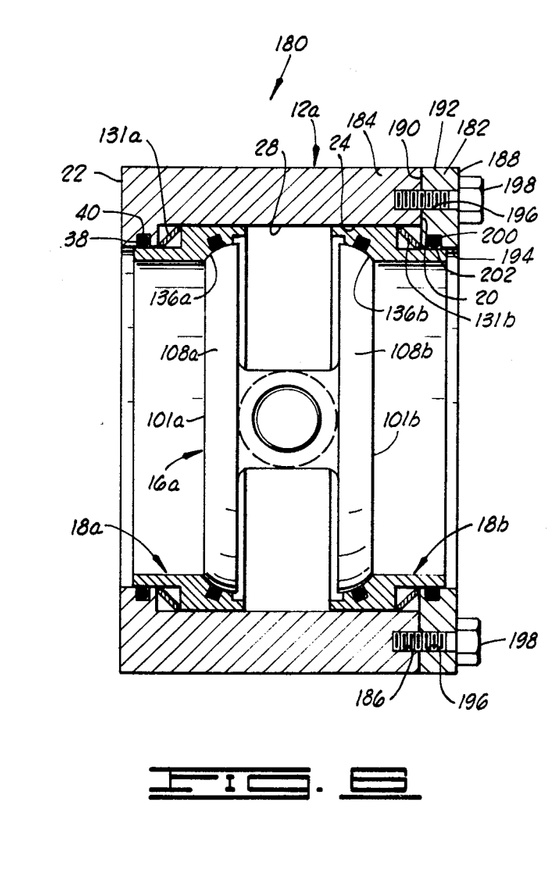

DESCRIPTION OF FIGS. 5 and 6

Referring now to FIGS. 5 and 6, shown therein and designated by the general reference numeral 180, is a third embodiment of a valve constructed in accordance with the present invention. The valve 180 is constructed to provide both upstream and downstream sealing when the valve 180 is closed.

As is the case with the valve 10, the valve 180 generally comprises: a valve body 12a; a valve stem assembly 14a; a valve closure member 16a; and an annular seat 18a. In addition, the valve 180 comprises a cap ring 182 and a second annular seat 18b. Except as noted herein, the valve body 12a and the valve stem assembly 14a of the valve 180 are identical to the valve body 12 and the valve stem assembly 14, respectively, of the valve 10. The valve closure member 16a comprises a first disc 101a and a second disc 101b, and the discs 101a and 101b are constructed identically to the disc 101 of the valve closure member 16 of the valve 10. Specifically, a first sealing surface 108a is formed on the first disc 101a and a second sealing surface 108b is formed on the second disc 101b in the same manner that the sealing surface 108 is formed on the disc 101 in the valve 10. The annular seats 18a and 18b are each identical to the annular seat 18 of the valve 10.

Referring specifically to the valve body 12a, a portion 184 thereof adjacent the first end 20 thereof is elongated to lengthen the first portion 28 of the flow passage bore 24. In particular, the valve body 12a is constructed such that the first portion 28 of the flow passage bore 24 is disposed symmetrically about the stem axis 48 in the valve 180. That is, the first portion 28 of the flow passage bore 24 extends equidistantly to either side of the stem axis 48 in the valve 180. A plurality of threaded bores 186 are formed in the valve body 12a, the threaded bores 186 intersecting the first end 20 of the valve body 12a and extending therefrom into the elongated portion 184 of the body 12a. As will be discussed below, the threaded bores 186 are utilized to secure the cap ring 182 to the valve body 12a.

The cap ring 182 is annular in shape, the cap ring 182 having: a first end 188, a second end 190 formed substantially parallel to the first end 188 and spaced a distance therefrom; a circular periphery 192, intersecting the first end 188 and the second end 190 and extending therebetween substantially perpendicular to the ends 188 and 190; and a circular flow bore 194 formed coaxially to the periphery 192, the bore 194 intersecting the ends 188 and 190 and extending therebetween.

A plurality of fastener bores 196 are formed through the cap ring 182, the bores 196 intersecting the first end 188 and the second end 190 of the cap ring 182 and extending therebetween. The bores 196 are positioned on the cap ring 182 to align with the threaded bores 186 in the valve body 12a and the cap ring 182 is secured to the valve body 12a via fasteners 198 which pass through the bores 196 of the cap ring 182 and engage threads in the bores 186 of the valve body 12a. The threaded bores 186 and the fastener bores 196 are further aligned such that, in the assembled valve 180, the second face 190 of the cap ring 182 abuts the first face 20 of the valve body 12a and the flow bore 194 of the cap ring 182 is coaxial with the flow passage bore 24 of the valve body 12a.

The flow bore 194 of the cap ring 182 is formed on a diameter 204 which is substantially equal to the diameter 36 of the second portion 34 of the flow passage bore 24 and the spacing between the ends 188 and 190 of the cap ring 182 is substantially equal to the length of the second portion 34 of the flow passage bore 24. An annular groove 200 is formed in the flow bore 194 of the cap ring 182 and extends circumferentially thereabout. The groove 200 is disposed symmetrically to the groove 38 in the second portion 34 of the flow passage bore 24 and contains an annular sealing ring 202 in the same manner that the groove 38 contains an annular sealing ring 40. Thus, portions of the flow passage bore 24 adjacent the first end 20 of the valve body 12a coact with the flow bore 194 of the cap ring 182 to duplicate, in mirror image, portions of the flow passage bore 24 adjacent the second end 22 of the valve body 12a. The term "disposed bilaterally symmetrically" will be used herein to denote that two identical structures are displaced in opposite directions from the stem axis 48 and one structure duplicates the other structure in mirror image. Thus, the flow bore 194 and the second portion 34 of the flow passage bore 24 are disposed bilaterally symmetrically; the groove 38 and a groove 200 are disposed bilaterally symmetrically and the annular sealing rings 40 and 202 are disposed bilaterally symmetrically.

The valve stem assembly 14a comprises a first trunnion 56a mounted in the first trunnion bore 46 of the valve body 12a in the same manner that the first trunnion 56 is mounted in the first trunnion bore 46 of the valve body 12 in the valve 10. The first trunnion 56a of the valve 180 differs from the first trunnion 56 of the valve 10 only in that the trunnion 56a is provided with two recesses, designated 64a and 64b, in the portion 62 of the first trunnion 56a disposed within the flow passage bore 24. The recesses 64a and 64b are shaped identically to the recess 64 of the valve 10 and the recess 64a is positioned in the first trunnion 56a identically to the positioning of the recess 64 in the first trunnion 56. The recesses 64a and 64b are disposed bilaterally symmetrically.

Similarly, the valve stem assembly 14a comprises a second trunnion 84a which differs from the second trunnion 84 of the valve 10 only in that the second trunnion 84a is provided with two recesses 90a and 90b. The recesses 90a and 90b are shaped identically to the recess 90 of the second trunnion 84 of the valve 10 and the recess 90a is positioned on the second trunnion 84a identically to the positioning of the recess 90 on the second trunnion 84. The recesses 90a and 90b are disposed bilaterally symmetrically.

Turning now to the valve closure member 16a, the discs 101a and 101b thereof are identical to the disc 101 of the valve closure member 16 in the valve 10 and the first disc 101a is positioned with respect to the valve stem assembly 14a identically to the positioning of the disc 101 of the valve 10 with respect to the valve stem assembly 14 of the valve 10. The discs 101a and 101b are disposed bilaterally symmetrically and the sealing surfaces 108a and 108b formed on the discs 101a and 101b are, accordingly, disposed bilaterally symmetrically.

The annular seat 18a is positioned in the valve 180 identically to the positioning of the annular seat 18 in the valve 10 and the annular seats 18a and 18b are disposed bilaterally symmetrically. Thus, in the closure mode of the valve 180, shown in the drawings, the sealing surface 136a of the annular seat 18a engages the sealing surface 108a while the sealing surface 136b engages the sealing surface 108b to provide both upstream and downstream sealing.

The valve 180 further comprises a first belleville spring 131a constructed identically to the belleville spring 131 of the valve 10 and positioned in the valve 180 identically to the positioning of the belleville spring 131 in the valve 10 such that the belleville spring 131a urges the annular seat 18a toward the stem axis 48. Similarly, a belleville spring 131b identical to the belleville spring 131a and disposed bilaterally symmetrically therewith, is provided to urge the annular seat 18b toward the stem axis 48. The belleville spring 131b is supported for urging the annular seat 18b toward the stem axis 48 by portions of the second end 190 of the cap ring 182 which project inwardly from the first portion 28 of the flow passage bore 24, such projection being provided by forming the flow bore 194 of the cap ring 182 on the same diameter 204 as the diameter 36 of the second portion 34 of the flow passage bore 24.

The assembly of the valve 180 is identical to the assembly of the valve 10 through the step of securing the valve closure member 16a to the trunnions 56a and 84a. Thereafter, the annular seat 18b, with the belleville spring 131b mounted thereon, is inserted into the flow passage bore 24 of the valve body 12a and the cap ring 182 is attached to the valve body 12a via the fasteners 198. The operation of the valve 180 differs from the operation of the valve 10 only in that two annular seats, the annular seats 18a and 18b, are displaced from the stem axis 48 to disengage the valve closure member 16a during the initial portions of the opening of the valve 180. The manner of displacement of the annular seats 18a and 18b is identical to the manner of the displacement of the annular seat 18 in the valve 10.

It is clear that the present invention is well adapted to carry out the objects and obtain the ends and advantages mentioned as well as those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. A valve, comprising:
  a valve body having formed therethrough:
    a circular flow passage bore formed about a flow axis of the valve; and
    a circular valve stem bore having a preselected valve stem bore radius and formed about a stem axis intersecting the flow axis at a right angle, whereby a portion of the valve stem bore forms a first trunnion bore intersecting the flow passage bore and another portion of the valve stem bore, formed coaxially with the first trunnion bore and diametrically opposed thereto with respect to the flow axis, forms a second trunnion bore intersecting the flow passage bore;
  a valve stem assembly supported by the valve body for rotation about the stem axis, the valve stem assembly comprising:
    a cylindrical first trunnion partially disposed within the first trunnion bore and extending therefrom into the flow passage bore, the first trunnion characterized as having a radius substantially equal to the valve stem bore radius and the first trunnion further characterized as having at least one recess formed in portions of the circular periphery thereof disposed within the flow passage bore and adjacent the intersection of the flow passage bore with the first trunnion bore; and each recess intersecting a portion of the circular periphery of the first trunnion defined by an arc subtending an angle of less than 180° and
    a cylindrical second trunnion partially disposed within the second trunnion bore and extending therefrom into the flow passage bore, the second trunnion characterized as having a radius substantially equal to the valve stem bore radius and the second trunnion further characterized as having at least one recess formed in portions of the circular periphery thereof disposed within the flow passage bore and adjacent the intersection of the flow passage bore with the second trunnion bore, and each recess intersecting a portion of the circular periphery of the second trunnion defined by an arc subtending an angle of less than 180° each recess formed in the second trunnion aligned with a recess in the first trunnion in the assembled valve and the recesses in the trunnions having a preselected recess depth;
  a valve closure member mounted on the valve stem assembly within the flow passage bore and between one of the recesses formed in the first trunnion and one of the recesses formed in the second trunnion, the valve closure member having formed thereon at least one sealing surface shaped to conform to a portion of a sphere having a preselected sealing surface radius, and the valve closure member positioned on the valve stem assembly so as to center the sealing surface formed on the valve closure member at the intersection of the flow axis and the stem axis;

at least one annular seat disposed within the flow passage bore, each annular seat slidingly engaging the valve body and extending circumferentially about the flow passage bore, each annular seat having a portion thereof disposed adjacent the valve stem assembly in the assembled valve, said portion being dimensioned to permit entry into the recesses formed in the trunnions and said portion terminating near the valve stem assembly in an annular planar stem engagement face, and each annular seat having formed within the inner periphery thereof a sealing surface shaped to mate with a sealing surface of the valve closure member, said sealing surface of each annular seat having a center of curvature displaced from the plane of the stem engagement face toward the stem axis a distance less than the stem bore radius and at least as large as the difference between the stem bore radius and the preselected recess depth; and means for urging each annular seal toward the stem axis.

2. The valve of claim 1 wherein the first trunnion is one portion of a unitarily constructed valve stem shaft and the second trunnion is another portion of the valve stem shaft.

3. The valve of claim 2 wherein the valve closure member is characterized as having one sealing surface formed thereon; wherein the valve comprises one annular seat; and wherein the valve closure member comprises:

a circular disc having a first face and a second face, the sealing surface of the valve closure member being formed on the periphery of the disc between the first face and the second face thereof;

a shaft mount mounted on the first face of the circular disc, the shaft mount having a circular bore formed therethrough for receiving the valve stem shaft in the assembled valve; and means for securing the valve stem shaft within the circular bore formed through the shaft mount.

4. The valve of claim 1 wherein portions of the annular seat adjacent the sealing surface thereof and portions of the valve closure member adjacent the sealing surface thereof are formed of a relatively hard material, wherein a circumferential groove is formed in the sealing surface of one of the annular seats and the valve closure member, and wherein the valve further comprises an annular sealing ring constructed of a relatively soft material and disposed in the circumferential groove.

5. The valve of claim 1 wherein the valve body is characterized as having a first end and a second end, the flow passage bore intersecting the first end and the second end and extending therebetween; wherein the first trunnion is further characterized as having two bilaterally symmetrically disposed recesses formed therein; wherein the valve closure member is further characterized as having two bilaterally symmetrically disposed sealing surfaces formed thereon; and wherein the valve comprises two annular seats, one annular seat displaced from the stem axis toward the first end of the valve body and the other annular seat displaced from the stem axis toward the second end of the valve body.

6. The valve of claim 1 wherein the valve closure member comprises at least one circular disc and wherein each sealing surface of the valve closure member is formed on the periphery of one of the discs.

7. The valve of claim 1 wherein the first trunnion is characterized as having a first end disposed within the flow passage bore; wherein the second trunnion is characterized as having a first end disposed within the flow passage bore; wherein a circular stud is formed on the first end of the first trunnion coaxially with the first trunnion; wherein a circular stud is formed on the first end of the second trunnion coaxially with the second trunnion; wherein the valve closure member comprises:

a first trunnion mount having a circular bore formed therethrough, the circular bore of the first trunnion mount receiving the circular stud formed on the first end of the first trunnion in the assembled valve;

means for securing the stud formed on the first end of the first trunnion within the circular bore formed through the first trunnion mount;

a second trunnion mount having a circular bore formed therethrough, the circular bore of the second trunnion receiving the circular stud formed on the first end of the second trunnion;

means for securing the stud formed on the first end of the second trunnion within the circular bore formed through the second trunnion mount in the assembled valve; and at least one circular disc connected to the trunnion mounts;

and wherein each sealing surface of the valve closure member is formed on the periphery of one of the discs.

8. The valve of claim 1 wherein the circular flow passage bore of the valve body is characterized as having a first portion formed on a first bore diameter and a second portion formed on a second bore diameter less than the first bore diameter, whereby a flow passage bore shoulder is formed in the flow passage bore; wherein the valve stem bore intersects the first portion of the flow passage bore; wherein an annular seat is disposed between the flow passage bore shoulder and the stem axis; and wherein the means for urging each annular seat toward the stem axis comprises a belleville spring disposed between the flow passage bore shoulder and the annular seat disposed between the flow passage bore shoulder and the stem axis, the belleville spring engaging the flow passage bore shoulder and the annular seat disposed between the flow passage bore shoulder and the stem axis for urging the annular seat disposed between the flow passage bore shoulder and the stem axis toward the stem axis.

9. The valve of claim 8 wherein the valve body is characterized as having a first end intersected by the first portion of the flow passage bore and a second end intersected by the second portion of the flow passage bore; wherein the valve further comprises a cap ring mounted on the first end of the valve body; the cap ring having formed therethrough a flow bore disposed concentrically with the flow passage bore and having a diameter less than the diameter of the first portion of the flow passage bore; wherein an annular seat is disposed between the stem axis and the cap ring; and wherein the means for urging each annular seat toward the stem axis further comprises a second belleville spring disposed between the cap ring and the annular seat positioned between the cap ring and the stem axis, the second belleville spring engaging the cap ring and the annular seat disposed between the cap ring and the stem axis for urging the annular seat disposed between the cap ring and the stem axis toward the stem axis.

10. The valve of claim 9 wherein the diameter of the flow bore of the cap ring is substantially equal to the diameter of the second portion of the flow passage bore; wherein an annular projection is formed on each annular seat, the annular projection formed on the annular seat disposed between the flow passage bore shoulder and the stem axis slidably engaging the second portion of the flow passage bore and the annular projection formed on the annular seat disposed between the stem axis and the cap ring slidably engaging the flow bore of the cap ring.

11. The valve of claim 10 wherein an annular groove is formed in the second portion of the flow passage bore; wherein an annular groove is formed in the flow bore of the cap ring; and wherein the valve further comprises:

an annular sealing ring disposed in the annular groove formed in the second portion of the flow passage bore and extending about the flow passage bore, the annular sealing ring engaging the annular projection formed on the annular seat disposed between the flow passage bore shoulder and the stem axis; and an annular sealing ring disposed in the annular groove formed in the flow bore of the cap ring, the annular sealing ring engaging the annular projection formed on the annular seat disposed between the stem axis and the cap ring.

* * * * *